United States Patent [19]

Coibion

[11] 4,065,603
[45] Dec. 27, 1977

[54] RACK FOR A STORAGE BATTERY

[75] Inventor: Jean Coibion, Tresses, France

[73] Assignee: Saft-Societe des Accumulateurs Fixes et de Traction, Romainville, France

[21] Appl. No.: 770,630

[22] Filed: Feb. 22, 1977

[30] Foreign Application Priority Data

Mar. 9, 1976 France .............................. 76.06705

[51] Int. Cl.² ........................................... H01M 2/10
[52] U.S. Cl. ..................................................... 429/99
[58] Field of Search ................ 429/99, 100, 159, 148, 429/96

[56] References Cited

U.S. PATENT DOCUMENTS

| 1,034,003 | 7/1912 | Edison | 429/148 |
| 1,364,358 | 1/1921 | Edison | 429/159 |
| 1,982,801 | 12/1934 | Gerking | 429/99 |
| 2,942,058 | 6/1960 | Herold | 429/99 |
| 3,623,917 | 12/1969 | Chassoux | 429/99 |
| 4,020,244 | 4/1977 | Selinko | 429/100 |

FOREIGN PATENT DOCUMENTS

| 1,267,153 | 12/1961 | France | 429/148 |
| 1,470,408 | 2/1967 | France | 429/99 |

*Primary Examiner*—Donald L. Walton
*Attorney, Agent, or Firm*—Kenyon & Kenyon, Reilly, Carr & Chapin

[57] ABSTRACT

A storage cell rack, particularly for use with storage batteries of large capacity, comprises two insulative end plates interconnected by at least two insulative longerons which are fastened to the plates and which are provided with storage cell supporting hollows into which projecting studs from the cell are receivable. The assembly of end plates and longerons rests on a stand comprising two metal bars which extend parallel to the longerons, each bar having its ends upturned to constitute uprights which are fastened to respective ones of the end plates.

10 Claims, 1 Drawing Figure

U.S. Patent  Dec. 27, 1977  4,065,603
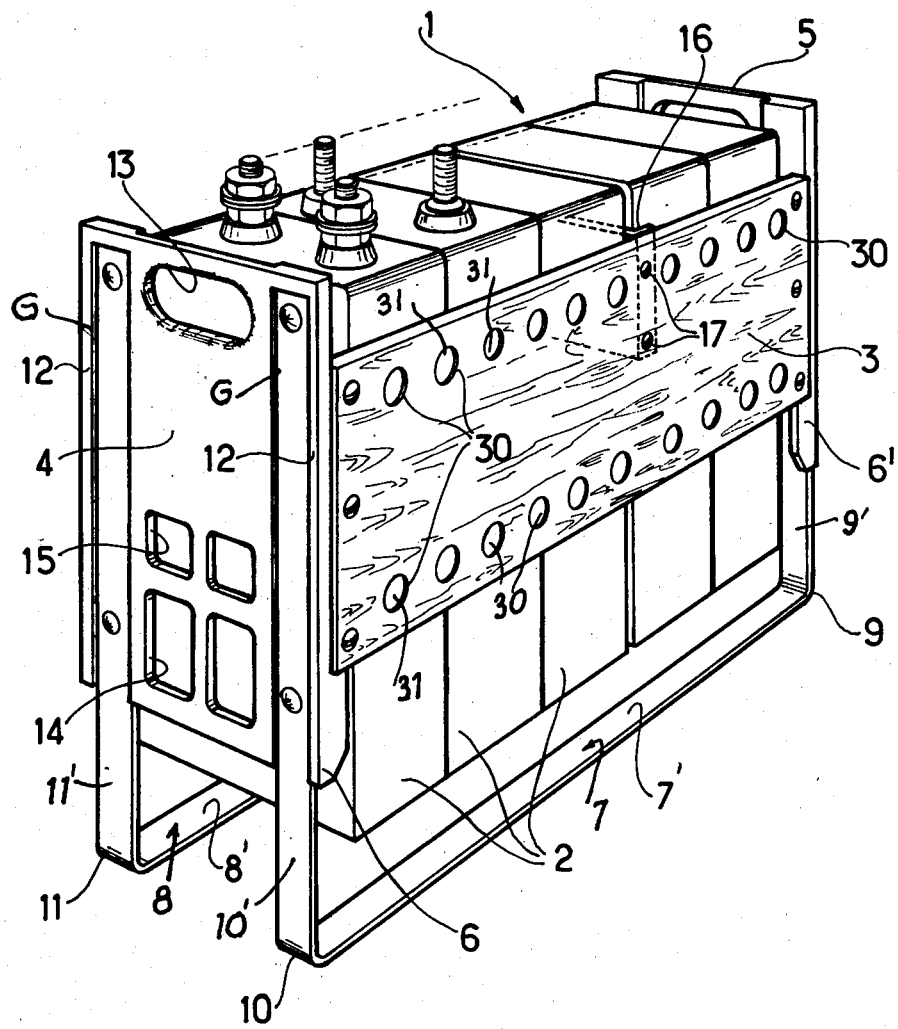

RACK FOR A STORAGE BATTERY

BACKGROUND OF INVENTION AND BRIEF SUMMARY

The present invention relates to a rack for a storage battery, in particular (but not exclusively) for high-capacity storage batteries (several hundreds of ampere-hours) which are consequently relatively heavy.

Available racks for such a battery have existed for a long time; one such consists mainly of two walls with their ends connected together by longerons to which the storage cells are fastened. The cells are fastened by knobs fixed on the storage cells which are engaged in cavities formed in the longerons. Since the MONA-HAN frame (U.S. Pat. No. 1,304,588) which was entirely made of wood, embodiments have been proposed which include metal frames for reinforcing the rack, as in French Pat. No. 1,407,408 and its addition Pat. No. 91,387, or else the wood has been replaced by plastic material as in U.S. Pat. No. 3,623,917.

Difficulties entailed with the known construction are of two kinds: mechanical and electrical. Mechanically, it is required to have an assembly which can be dragged along the ground if necessary without being damaged and which can even be dropped in some circumstances without detriment to the storage cells or destruction of the rack. Electrically, the metal frames must not form a leakage path towards the ground from the containers of the storage cells, even in the presence of possible leakages of electrolyte which would provide short circuits between the containers and the frames.

Only partial solutions have been found for these problems in known racks: Wooden skids are relatively insulative, but are not very shock-proof because of their insufficient elasticity. Plastic materials are relatively expensive and do not always have the required strength.

Preferred embodiments of the present invention make it possible to mitigate these disadvantages and to provide satisfactory solutions to the mechanical and electrical problems set forth hereinabove.

The present invention provides a storage cell rack comprising a pair of insulative end plates interconnected by at least two insulative longerons, the longerons being fastened to the end plates and being provided with storage cell supporting hollows or holes capable of receiving studs or like projections secured to the cell casings, the assembly of end plates and longerons being carried on a stand comprising two metal bars extending parallel to the longerons, each bar having its opposite ends upturned to constitute uprights which are fastened to respective ones of the end plates.

In this way, the metal bars provide elasticity which enables the assembled rack to absorb shock when dropped. Also since they are fastened to the insulative end plates, they are electrically insulated from the casings of each storage cell.

In an advantageous embodiment the metal bars are in the form of flat strips whose width extends in a plane perpendicular to that of longerons. Their portions between uprights thus constitute a pair of skids for the rack reducing the effort required for moving the battery.

DETAILED DESCRIPTION

The single FIGURE is a perspective view of a rack embodying the invention.

In the FIGURE, a rack 1 contains a battery of five storage cells 2. The storage cells are conventionally suspended from longerons 3 (only one of which is illustrated) by projections or studs 31 provided for the cell casings. These studs engage holes or hollows 30 in the longerons 3 and thus suspend the cell therebetween. The longerons 3 are made preferably of wood and are screwed to flanges 6 and 6' provideed at the side edges of plastic end plates 4 and 5.

The flanges 6 and 6' extend substantially along the entire lengths of the edges of the end plates 4 and 5 but they could alternatively be constituted by tabs on said end plates positioned to receive screws extending through the longerons 3 and with gaps between adjacent tabs.

Two metal bars 7 and 8 form a supporting stand for the rack 1. The bar 7 has two right angle upwardly directed bends at 9 and 10, and the bar 8 has two similar upwardly directed right-angle bends, only one of which 11, can be seen in the FIGURE, respectively providing upright portions 9', 10', 11'. Those portions of the bars 7 and 8 which lie between their bends form horizontal skids 7' and 8' while the upwardly directed portions beyond the bends are vertical and are received and secured as by riveting in grooves G in the end plates 4 and 5 (as can be seen in the case of the end plate 4).

The grooves G have outside rims 12 which provide the advantage of an increased length for possible leakage paths of electrolyte seeping from the cells 2.

Each of the end plates 4 or 5 has a hole or opening such as 13 which thus provides a handle for the rack 1 and also has further holes or openings such as 14 and 15 which serve to lighten each end plate and facilitate injection molding thereof. The end plates are molded from a plastic material such as polypropylene, an acrylonitrile-butadiene styrene, a polyvinyl chloride or a polyethylene.

When the number of storage cells is high enough (at least four) it is preferable to provide a transverse brace 16 spanning the distance between the opposite longerons 3 at or near the middle of the battery of storage cells 2. In the illustrated embodiment of five storage cells 2, the spanning brace 16 is positioned between the second and the third storage cells. This brace 16 is a flat member which is not as tall as the end plates, and can be made of a plastic material or of metal, spans the distance between opposite longerons 3. Fasteners such as screws 17 are shown in the FIGURE to secure the brace to respective longerons 3.

It is to be noted that the bottoms of the cells 2 are spaced from the skid portions 7' and 8' of the bars 7 and 8 to prevent damage to the cell casings when the rack is either dragged or dropped.

It must be understood that the invention is not limited to the foregoing description and modifications can be made thereto within the scope of the appended claims. In particular two or more longerons can be provided on each side of the end plates, instead of only one as described. The metal bars moreover can be both thicker and narrower than shown and would consequently no longer be regardable as strips. Other variations likewise are possible and are contemplated.

What is claimed is:

1. A storage cell rack comprising a pair of insulative end plates, at least two insulative longerons interconnecting said end plates, means for fastening the longerons to the end plates, said longerons having storage cell supporting hollows, a stand comprising two metal bars extending parallel to the longerons for supporting an assembly of end plates and longerons, each bar having is ends upturned to constitute uprights, and means fastening the said ends to respective ones of the end plates.

2. A rack according to claim 1, wherein the metal bars are flat strips whose widths extend in a plane perpendicular to that of longerons.

3. A rack according to claim 1 wherein the longerons are made of wood and wherein the end plates are of a plastic material.

4. A rack according to claim 3 wherein the end plates have holes at least some of which are disposed to provide a handle for the rack.

5. A rack according to claim 3 wherein the plastic material of the end plates is selected from the group consisting of polypropylene, acrylonitrile-butadiene-styrene, polyvinyl chloride and polyethylene.

6. A rack according to claim 1 including at least one transverse brace between the longerons at a point intermediate the end plates.

7. A rack according to claim 1, wherein said hollows are openings in the longerons to receive projections secured to cell casings.

8. A rack according to claim 1, wherein said end plates include grooves to receive respective ones of the uprights.

9. A rack according to claim 1 including means to secure said longerons to said end plates.

10. A rack according to claim 9, wherein said means comprise flanges on side edges of said end plates to which said longerons are attached.